United States Patent
Lee et al.

(10) Patent No.: US 12,272,783 B2
(45) Date of Patent: Apr. 8, 2025

(54) ELECTROLYTE MEMBRANE FOR ALL-SOLID STATE BATTERY AND ALL-SOLID STATE BATTERY INCLUDING THE SAME

(71) Applicant: LG ENERGY SOLUTION, LTD., Seoul (KR)

(72) Inventors: Jung-Pil Lee, Daejeon (KR); Sung-Joong Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 652 days.

(21) Appl. No.: 17/629,928

(22) PCT Filed: Sep. 11, 2020

(86) PCT No.: PCT/KR2020/012345
§ 371 (c)(1),
(2) Date: Jan. 25, 2022

(87) PCT Pub. No.: WO2021/049919
PCT Pub. Date: Mar. 18, 2021

(65) Prior Publication Data
US 2022/0294001 A1    Sep. 15, 2022

(30) Foreign Application Priority Data
Sep. 11, 2019    (KR) .................. 10-2019-0113061

(51) Int. Cl.
*H01M 10/056*    (2010.01)
*H01M 10/0525*    (2010.01)

(52) U.S. Cl.
CPC ..... *H01M 10/056* (2013.01); *H01M 10/0525* (2013.01); *H01M 2300/0065* (2013.01)

(58) Field of Classification Search
CPC .................. H01M 10/0565; H01M 2300/0065
See application file for complete search history.

(56) References Cited

U.S. PATENT DOCUMENTS 4,828,945 A    5/1989    Nagata et al.
6,645,675 B1    11/2003    Munshi
(Continued)

FOREIGN PATENT DOCUMENTS

CN    1372705 A    10/2002
CN    105470569 A    4/2016
(Continued)

OTHER PUBLICATIONS

KR 100942477 English translation obtained via Google Patents Oct. 16, 2024.*
(Continued)

*Primary Examiner* — Sarah A. Slifka
(74) *Attorney, Agent, or Firm* — Birch, Stewart, Kolasch & Birch, LLP (57) ABSTRACT

The solid electrolyte membrane according to the present disclosure interrupts migration of lithium ions by the formation of an ion conduction-interrupting layer in the electrolyte membrane through the phase separation of polymers under a high-temperature condition, including an increase in the internal temperature of a battery. Since a battery is prevented from thermal runaway and explosion through the formation of the 'ion conduction-interrupting layer' (also referred to as 'interrupting layer'), it is possible to improve the heat resistance and safety of the battery.

12 Claims, 3 Drawing Sheets

(56) References Cited

U.S. PATENT DOCUMENTS

| | | |
|---|---|---|
| 2008/0268346 A1 | 10/2008 | Inda |
| 2010/0098997 A1 | 4/2010 | Ohgi et al. |
| 2010/0221614 A1 | 9/2010 | Bertin et al. |
| 2014/0234726 A1 | 8/2014 | Christensen et al. |
| 2016/0013515 A1 | 1/2016 | Lee et al. |
| 2016/0064773 A1 | 3/2016 | Choi et al. |
| 2016/0087306 A1 | 3/2016 | Lee et al. |
| 2016/0093916 A1 | 3/2016 | Moon et al. |
| 2016/0294005 A1 | 10/2016 | Lee et al. |
| 2017/0187063 A1 | 6/2017 | Pistorino et al. |
| 2017/0294678 A1 | 10/2017 | Lee et al. |
| 2018/0034096 A1 | 2/2018 | Teran et al. |
| 2019/0088997 A1 | 3/2019 | Bouchet et al. |
| 2019/0386340 A1 | 12/2019 | Kim et al. |

FOREIGN PATENT DOCUMENTS

| | | | |
|---|---|---|---|
| EP | 3 407 413 A1 | | 11/2018 |
| EP | 3 907 802 A1 | | 11/2021 |
| EP | 4 016 687 A1 | | 6/2022 |
| JP | 2000-58065 A | | 2/2000 |
| JP | 2004-95342 A | | 3/2004 |
| JP | 2005-220271 A | | 8/2005 |
| JP | 2008-222957 A | | 8/2008 |
| JP | 2016-62895 A | | 4/2016 |
| JP | 2016-512649 A | | 4/2016 |
| JP | 2019-513283 A | | 5/2019 |
| JP | 2019-524977 A | | 9/2019 |
| KR | 10-1997-0004136 B1 | | 3/1997 |
| KR | 10-2009-0015036 A | | 2/2009 |
| KR | 10-2009-0112674 A | | 10/2009 |
| KR | 10-0942477 B1 | | 2/2010 |
| KR | 10-2016-0026644 A | | 3/2016 |
| KR | 10-2016-0118958 A | | 10/2016 |
| KR | 10-2018-0124546 A | | 11/2018 |
| KR | 10-2019-0033422 A | | 3/2019 |

OTHER PUBLICATIONS

Extended European Search Report for European Application No. 20863928.6, dated Jul. 25, 2022.

International Search Report (PCT/ISA/210) issued in PCT/KR2020/012345 mailed on Jan. 12, 2021.

* cited by examiner

ELECTROLYTE MEMBRANE FOR ALL-SOLID STATE BATTERY AND ALL-SOLID STATE BATTERY INCLUDING THE SAME

TECHNICAL FIELD

The present application claims priority to Korean Patent Application No. 10-2019-0113061 filed on Sep. 11, 2019 in the Republic of Korea. The present disclosure relates to an electrolyte membrane for a solid state battery, having improved heat resistance and safety and showing an improved shut-down function, and a solid state battery including the same.

BACKGROUND ART

In a lithium ion battery using a liquid electrolyte, the liquid electrolyte may be leaked to the outside of the battery, when the battery is deformed by impact or external environment, or the electrolyte may be combusted due to a short-circuit, or the like, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

In general, polymeric solid electrolyte, oxide-based solid electrolyte and sulfide-based solid electrolyte materials are used as solid electrolyte materials. When free-standing type electrolyte membranes are manufactured by using such solid electrolyte materials alone, defects, such as tearing or cracking, or separation of the electrolyte materials may occur during the manufacture or use of batteries. Particularly, when lithium metal is used as a negative electrode active material, there is a problem in that lithium dendrite is grown from the negative electrode surface and the thus grown lithium dendrite causes a short-circuit in a battery when it is in contact with a positive electrode. In a solid state battery, a solid electrolyte membrane functions as an electrical insulator between a positive electrode and a negative electrode, instead of a separator. Particularly, when a polymeric material is used as a solid electrolyte, the solid electrolyte membrane may be damaged due to the growth of lithium dendrite. When the electrolyte membrane is damaged as mentioned above, electric current is concentrated at the damaged portion to cause rapid heat emission, resulting in ignition and explosion. Particularly, in the case of a large-size battery, a large amount of heat is generated by a short-circuit, and thus there is a problem in that the above-mentioned problem may become more serious. Therefore, there is a need for developing an electrolyte membrane capable of realizing a shut-down function rapidly, when a short-circuit occurs and a rapid increase in internal temperature of a battery occurs accordingly.

DISCLOSURE

Technical Problem

The present disclosure is designed to solve the problems of the related art, and therefore the present disclosure is directed to providing a solid electrolyte membrane provided with a shut-down function, and a solid state battery including the same. These and other objects and advantages of the present disclosure may be understood from the following detailed description. Also, it will be easily understood that the objects and advantages of the present disclosure may be realized by the means shown in the appended claims and combinations thereof.

Technical Solution

In one aspect of the present disclosure, there is provided a solid electrolyte membrane for a solid state battery according to any one of the following embodiments. According to the first embodiment of the present disclosure, there is provided a solid electrolyte membrane for a solid state battery, which has an ion conductivity of $1 \times 10^{-7}$ S/cm or more at 20-30° C., and includes a mixture of a polymer material (A) and a solid electrolyte material (B), wherein the polymer material (A) includes a block copolymer and has an ion conductivity of $5 \times 10^{-7}$ S/cm or less at 20-30° C.

According to the second embodiment of the present disclosure, there is provided the solid electrolyte membrane for a solid state battery as defined in the first embodiment, wherein the polymer material (A) includes an olefinic polymerization unit, a styrenic polymerization unit, an acrylic polymerization unit, a carbide-based polymerization unit, an ester-based polymerization unit, or two or more polymerization units selected therefrom.

According to the third embodiment of the present disclosure, there is provided the solid electrolyte membrane for a solid state battery as defined in the first or the second embodiment, wherein the polymer material (A) includes ethylene oxide, a polymerization unit of a polyether polymer, a polymerization unit of a polycarbonate polymer, a polymerization unit of a polyacrylate polymer, a polymerization unit of a polysiloxane polymer, a polymerization unit of a phosphazene polymer, a polymerization unit of a polypropylene oxide polymer, a polymerization unit of a polyphosphate polymer, a polymerization unit of polyvinyl alcohol, a polymerization unit of a polyvinylidene fluoride polymer, or two or more polymerization units selected therefrom.

According to the fourth embodiment of the present disclosure, there is provided the solid electrolyte membrane for a solid state battery as defined in any one of the first to the third embodiments, wherein the polymer material (A) includes at least one compound represented by the following Chemical Formula 1:

[Chemical Formula 1]

wherein each of m and n independently represents an integer of 1 or more; $P_B$ represents ethylene oxide, a polymerization unit of a polyether polymer, a polymerization unit of a polycarbonate polymer, a polymerization unit of a polyacrylate polymer, a polymerization unit of a polysiloxane polymer, a polymerization unit of a phosphazene polymer, a polymerization unit of a polypropylene oxide polymer, a polymerization unit of a polyphosphate polymer, a polymerization unit of polyvinyl alcohol, a polymerization unit of a polyvinylidene fluoride polymer, or two or more polymerization units selected therefrom; and $P_A$ represents an olefinic polymerization unit, a styrenic polymerization unit, an acrylic polymerization unit, a carbide-based polymerization unit, an ester-based polymerization unit, or two or more polymerization units selected therefrom.

According to the fifth embodiment of the present disclosure, there is provided the solid electrolyte membrane for a solid state battery as defined in any one of the first to the fourth embodiments, wherein the solid electrolyte material (B) includes a polymeric solid electrolyte material, a sulfide-based solid electrolyte material, an oxide-based solid electrolyte material, or two or more of them, and includes the polymeric solid electrolyte material in an amount of 80 wt % or more.

According to the sixth embodiment of the present disclosure, there is provided the solid electrolyte membrane for a solid state battery as defined in the fifth embodiment, wherein the polymeric solid electrolyte material is a polymeric electrolyte (C) formed by mixing a lithium salt (C1) with a polymer resin (C2), and the polymeric electrolyte has an ion conductivity of $1 \times 10^{-7}$ S/cm or more at 20-30° C.

According to the seventh embodiment of the present disclosure, there is provided the solid electrolyte membrane for a solid state battery as defined in the fifth or the sixth embodiment, wherein the polymer resin (C2) includes a polyether polymer, a polycarbonate polymer, an acrylate polymer, a polysiloxane polymer, a phosphazene polymer, a polyethylene derivative, an alkylene oxide derivative including polypropyleneoxide and/or polyethylene oxide, a polyvinyl acetate polymer, a polyphosphate polymer, a polyacrylonitrile polymer, polyalginate lysine, polyester sulfide, polyvinyl alcohol, a polyvinylidene fluoride polymer, or a mixture of two or more of them.

According to the eighth embodiment of the present disclosure, there is provided the solid electrolyte membrane for a solid state battery as defined in any one of the first to the seventh embodiments, wherein the solid electrolyte material (B) is used in an amount of 20-80 wt % based on 100 wt % of the total solid electrolyte membrane.

According to the ninth embodiment of the present disclosure, there is provided the solid electrolyte membrane for a solid state battery as defined in any one of the fourth to the eighth embodiments, wherein $P_B$ is present in an amount of 10-90 wt % based on 100 wt % of the polymer material (A).

According to the tenth embodiment of the present disclosure, there is provided the solid electrolyte membrane for a solid state battery as defined in any one of the sixth to the ninth embodiments, wherein the polymer resin (C2) has a molecular weight (Mn) of 1-10,000 kg/mol.

According to the eleventh embodiment of the present disclosure, there is provided the solid electrolyte membrane for a solid state battery as defined in any one of the first to the ninth embodiments, wherein the polymer material (A) has a molecular weight (Mn) of 1-10,000 kg/mol.

According to the twelfth embodiment of the present disclosure, there is provided the solid electrolyte membrane for a solid state battery as defined in any one of the fifth to the eleventh embodiments, wherein the solid electrolyte material (B) includes the polymeric solid electrolyte material in an amount of 80 wt % or more based on 100 wt % of the solid electrolyte material (B).

Advantageous Effects

The solid electrolyte membrane according to the present disclosure interrupts migration of lithium ions by the formation of an ion conduction-interrupting layer in the electrolyte membrane through the phase separation of polymers under a high-temperature condition, including an increase in the internal temperature of a battery. Since a battery is prevented from thermal runaway and explosion through the formation of the 'ion conduction-interrupting layer' (also referred to as 'interrupting layer' hereinafter), it is possible to improve the heat resistance and safety of the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements, unless otherwise stated.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to an electrolyte membrane for a solid state battery and a solid state battery including the same. The solid electrolyte membrane according to the present disclosure generally functions as an insulation barrier and ion conductive layer between a positive electrode and a negative electrode in a battery driving temperature range, and can control the driving of a battery through the formation of an ion conduction-interrupting layer, when the internal temperature of the battery is increased rapidly due to the generation of a short-circuit in the battery, or the like. According to the present disclosure, the ion conduction-interrupting layer is formed by melting and phase separation of a polymer material (A) having low ion conductivity and contained in the solid electrolyte membrane.

Figure 1:
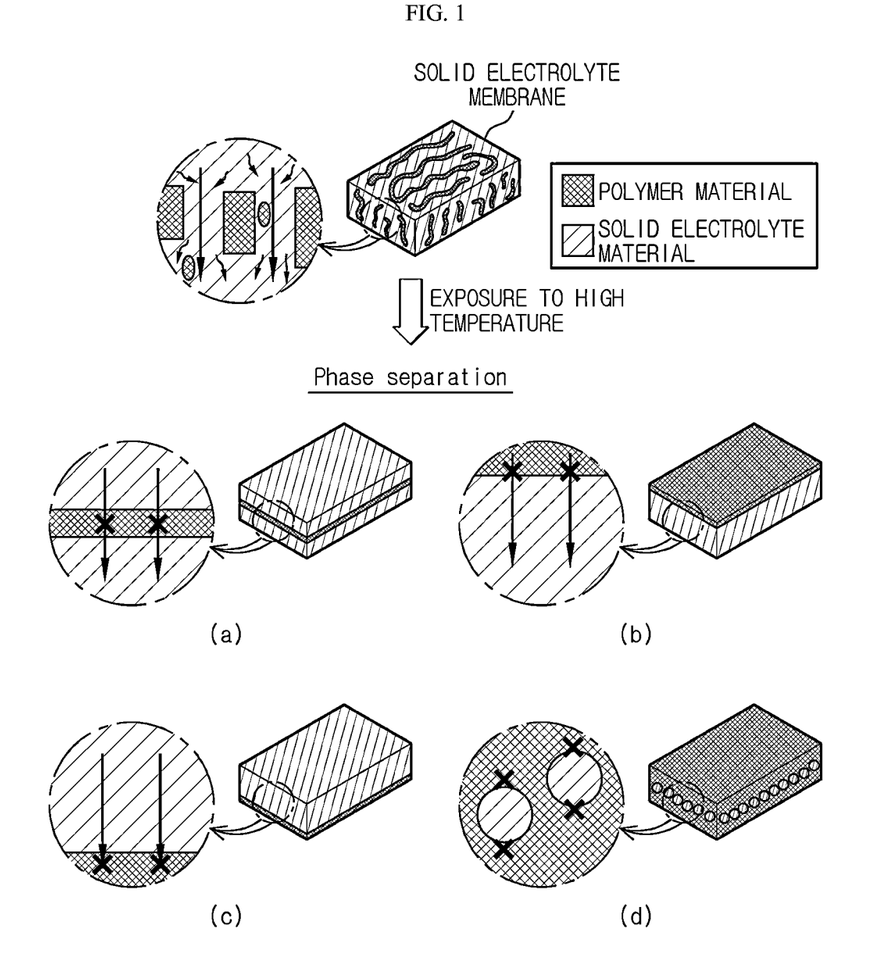
FIG. 1 is a schematic view illustrating the structure of the solid electrolyte membrane according to an embodiment of the present disclosure and the mechanism of formation of an insulation film through phase separation.

FIG. 1 is a schematic view illustrating the structure of the solid electrolyte membrane according to an embodiment of the present disclosure and the mechanism of formation of an insulation film through phase separation. Hereinafter, the solid electrolyte membrane according to the present disclosure will be explained in detail with reference to FIG. 1.

The solid electrolyte membrane according to the present disclosure is interposed between a positive electrode and a negative electrode of a solid state battery and plays a role as an electrical insulating- and ion conductive-layer between the positive electrode and the negative electrode. According to an embodiment of the present disclosure, the solid electrolyte membrane has an ion conductivity of $1 \times 10^{-7}$ S/cm or more at room temperature (20-30° C.) and may have a sheet-like shape having a thickness of 15-100 μm.

According to the present disclosure, the solid electrolyte membrane includes a solid electrolyte material (B) and a polymer material (A) having low ion conductivity.

According to an embodiment of the present disclosure, the solid electrolyte material (B) has an ion conductivity of $1 \times 10^{-7}$ S/cm or more, $1 \times 10^{-7}$ S/cm or more, or $1 \times 10^{-5}$ S/cm or more at room temperature (20-30° C.), and may include a polymeric solid electrolyte material, an oxide-based solid electrolyte material, a sulfide-based solid electrolyte material, or two or more of them.

Preferably, the solid electrolyte material (B) may include a polymeric solid electrolyte material in an amount of 80 wt % or more, 90 wt % or more, or 99 wt % or more. According to an embodiment of the present disclosure, the solid electrolyte material (B) may include a polymeric solid electrolyte material in an amount of 100 wt %. As described hereinafter, the polymer material (A) and the solid electrolyte material (B) including a polymeric solid electrolyte material in the solid electrolyte membrane are molten at least partially under a high-temperature condition, and thus phase separation occurs between the polymer material (A) and the solid electrolyte material (B) in the solid electrolyte membrane. As a result, as shown in FIG. 1, an ion conduction-interrupting layer including the polymer material (A) may be formed in the solid electrolyte membrane. In other words, according to the present disclosure, the solid electrolyte material (B) preferably includes a polymeric solid electrolyte material in an amount within the above-defined weight percent range with a view to facilitating the phase separation of the polymer material (A).

According to an embodiment of the present disclosure, the solid electrolyte material (B) may be used in an amount of 20-90 wt %, 30-85 wt %, or 40-80 wt %, based on 100 wt % of the solid electrolyte membrane. When the content of the solid electrolyte material (B) satisfies the above-defined range, phase separation of the polymer materials contained in the solid electrolyte membrane is carried out effectively, after the solid electrolyte membrane is exposed to high temperature. Particularly, the polymer material (A), which is non-ion conductive or has low ion conductivity, may form an ion conduction-interrupting layer in a direction perpendicular to the thickness direction of the solid electrolyte membrane or horizontal to the solid electrolyte membrane.

The polymeric solid electrolyte material may be a composite of a lithium salt (C1) mixed with a polymer resin (C2), i.e. may be a polymeric electrolyte (C) formed by adding a polymer resin (C2) to a solvated a lithium salt (C1), and the polymeric electrolyte has an ion conductivity of $1 \times 10^{-7}$ S/cm or more at room temperature (20-30° C.).

The polymer resin (C2) includes a polar element, such as oxygen or nitrogen, and such elements are coordinated with dissociated ions to form a polymer-ion complex, thereby allowing conduction of lithium ions. Non-limiting examples of the polymer resin (C2) include at least one selected from a polyether polymer, a polycarbonate polymer, an acrylate polymer, a polysiloxane polymer, a phosphazene polymer, a polyethylene derivative, an alkylene oxide derivative including polypropyleneoxide and/or polyethylene oxide, a polyvinyl acetate polymer, a polyphosphate polymer, a polyacrylonitrile polymer, polyalginate-lysine, polyester sulfide, polyvinyl alcohol, a polyvinylidene fluoride polymer, a polymer containing an ionically dissociable group, or the like. According to an embodiment of the present disclosure, the polymer electrolyte may include at least one selected from a branched copolymer, a comb-like polymer and a crosslinked polymer resin, including polyethylene oxide (PEO) backbone copolymerized with a comonomer including at least one amorphous polymer selected from PMMA, polycarbonate, polydimethylsiloxane (pdms) and phosphazene. Meanwhile, according to an embodiment of the present disclosure, the polymer resin may show ion conductivity.

According to an embodiment of the present disclosure, the polymer resin (C2) may be selected from the group consisting of polyethylene oxide (PEO), polypropylene oxide (PPO), polyacrylonitrile (PAN), polyvinyl chloride (PVC), poly(vinylidene fluoride) (PVDF), polymethyl methacrylate (PMMA), polysiloxane, polypropylene carbonate (PPC), polyphosphazene and combinations thereof, but is not limited thereto.

According to an embodiment of the present disclosure, the polymer resin (C2) may have a molecular weight (Mn) of 1-10,000 kg/mol. In terms of the physical strength of the solid electrolyte membrane, the molecular weight is preferably 1 kg/mol or more. Meanwhile, in terms of molecular mobility and phase separation effect, the molecular weight is preferably 10,000 kg/mol or less. For example, the molecular weight may be determined by using gel permeation chromatography (PL GPC220, Agilent Technologies).

In the electrolyte according to the present disclosure, the lithium salt is an ionizable lithium salt and may be represented by $Li^+X^-$. The anion (X) of lithium salt is not particularly limited and particular examples thereof include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

According to an embodiment of the present disclosure, the polymer material (A) has no ion conductivity or has low ion conductivity in the solid electrolyte membrane. For example, the polymer material (A) may have an ion conductivity of $5 \times 10^{-7}$ S/cm or less, or $9 \times 10^{-8}$ S/cm or less at room temperature (20-30° C.).

According to an embodiment of the present disclosure, the polymer material (A) may include a copolymer, which may include a polymerization unit forming at least one polymer resin (C2) as its polymerization unit. According to an embodiment of the present disclosure, the copolymer may include a block copolymer, a graft copolymer or both. The block copolymer is obtained by forming a block through the polymerization of monomers and forming another block through the polymerization of another type of monomers, repeatedly. The graft copolymer is obtained by grafting a side chain formed through the polymerization of monomers to a backbone formed through the polymerization of another type of monomers.

According to an embodiment of the present disclosure, the block copolymer that may be used as the polymer material (A) is represented by the following Chemical Formula 1, wherein each of m and n independently represents an integer of 1 or more:

[Chemical Formula 1]

In Chemical Formula 1, $P_B$ represents a polymerization unit forming the polymer resin (C2). Particular examples of $P_B$ may include ethylene oxide as a polymerization unit of polyethylene oxide. In addition to ethylene oxide, $P_B$ may include at least one polymerization unit selected from the group consisting of a polymerization unit of a polyether polymer, a polymerization unit of a polycarbonate polymer, a polymerization unit of a polyacrylate polymer, a polymerization unit of a polysiloxane polymer, a polymerization unit of a phosphazene polymer, a polymerization unit of a polypropylene oxide polymer, a polymerization unit of a polyphosphate polymer, a polymerization unit of polyvinyl alcohol, and a polymerization unit of a polyvinylidene fluoride polymer. More particularly, $P_B$ may include at least one selected from ethylene oxide, carbonate, amide, imide, aspartic acid, acrylonitrile, peptide, acrylate, urethane, acrylamide, acrylic acid, vinyl acetate, vinylidene chloride and methyl methacrylate.

Meanwhile, $P_A$ represents an olefinic polymerization unit, a styrenic polymerization unit, an acrylic polymerization unit, a carbide-based polymerization unit, an ester-based polymerization unit, a diene-based polymerization unit, such as ethylene, a lactone-based polymerization unit, or two or more polymerization units selected therefrom. More particularly, $P_A$ may include at least one selected from ethylene, propylene and isobutylene, as a polymerization unit.

According to a preferred embodiment of the present disclosure, $P_B$ in the polymer material (A) represented by Chemical Formula 1 may include a polymerization unit forming the polymer resin (C2) used actually in the solid electrolyte membrane obtained finally. For example, when using polyethylene oxide (PEO) as a polymer resin (C2) of a polymeric solid electrolyte, the polymer material (A) may include, as unit $P_B$, a copolymer including ethylene oxide as a polymerization unit.

According to an embodiment of the present disclosure, the polymer material (A) may include a polystyrene-based copolymer (PS-b-PEO) including a styrenic polymerization unit and an ethylene oxide polymerization unit, and such a polystyrene-based copolymer has an ion conductivity of $9 \times 10^{-7}$ S/cm. For example, the polystyrene-based copolymer may be a block copolymer containing styrene blocks and ethylene oxide blocks.

When the polymer material (A) has the above-described characteristics, $P_B$ may be used in an amount of 10-90 wt %, preferably 20-80 wt %, based on 100 wt % of the polymer material (A). According to an embodiment of the present disclosure, the content of $P_B$ and/or $P_A$ may be determined by TGA (thermogravimetric analysis) or GC-mass (gas chromatography-mass spectrometry).

Meanwhile, according to an embodiment of the present disclosure, the polymer material (A) may have a molecular weight of 1-10,000 kg/mol, or 10-1,000 kg/mol. Within the above-defined range, the molecular weight is preferably 1-10 kg/mol in terms of the physical strength of the solid electrolyte membrane. In addition, when the molecular weight is excessively low, the polymer chain is too short to form a layered structure through phase separation in the electrolyte membrane. Meanwhile, in terms of molecular mobility and phase separation effect, the molecular weight is preferably 10,000 kg/mol or less.

According to an embodiment of the present disclosure, the polymer material (A) has a glass transition temperature (Tg) and/or melting point Tm of 150° C. or lower. When the melting point exceeds the above-defined range, the polymer material (A) cannot be molten and chain mobility cannot be realized, even when the internal temperature of a battery is increased, resulting in a failure in phase separation. Therefore, it is difficult to accomplish desired effects.

According to the present disclosure, the solid electrolyte membrane has a thickness of about 100 μm or less, preferably about 15-90 μm. Within the above-defined range, the solid electrolyte membrane may have an adequate thickness, considering ion conductivity, physical strength, energy density of an applicable battery. For example, in terms of ion conductivity and energy density, the thickness may be 80 μm or less, 70 μm or less, 60 μm or less, or 50 μm or less. Meanwhile, in terms of physical strength, the thickness may be 20 μm or more, 30 μm or more, or 40 μm or more.

As described above, in the solid electrolyte membrane according to an embodiment of the present disclosure, phase separation between the solid electrolyte material (B) and the polymer material (A) is induced according to a change in temperature, particularly an increase in temperature, thereby forming an ion conduction-interrupting layer including the polymer material (A) in the solid electrolyte membrane. In other words, the polymer material (A) having low ion conductivity and contained in the solid electrolyte membrane is molten under a specific temperature condition and forms an ion conduction-interrupting layer in the solid electrolyte membrane according to a phase separation behavior (see, FIG. 1). Ion conduction between a positive electrode and a negative electrode is interrupted by the formation of such an ion conduction-interrupting layer. In this manner, operation of a battery may be interrupted. In other words, a battery stops driving, when the internal temperature of the battery is increased rapidly. Therefore, it is possible to prevent any further increase in temperature or explosion of the battery caused by such an increase in temperature.

FIG. 1 is a schematic view illustrating the structure of the solid electrolyte membrane according to an embodiment of the present disclosure and the mechanism of formation of an insulation film through phase separation. In FIG. 1, the black arrow mark shows lithium ion migration. Under a general battery driving temperature condition, the polymer material (A) is distributed randomly in the solid electrolyte membrane and does not disturb lithium ion conduction between a positive electrode and a negative electrode. Therefore, the solid electrolyte membrane shows ion conductivity derived from the solid electrolyte material (B). Meanwhile, when the internal temperature of the battery is increased, the polymer material (A) and the solid electrolyte material (B) have increased flowability. Particularly, when the solid electrolyte material (B) includes a polymeric solid electrolyte material as a main ingredient, the solid electrolyte membrane is molten to cause phase separation between the polymeric solid electrolyte material and the polymer material. As a result, the polymer material (A) forms an interrupting layer with a layered structure in the solid electrolyte membrane, thereby interrupting ion conduction. As schematically shown in FIG. 1, the interrupting layer may be formed with a layered structure, like (a), (b) and (c). The position of the interrupting layer is not limited to the position as shown in FIG. 1, but the interrupting layer may be formed at any position based on the thickness of the solid electrolyte membrane. In addition, the interrupting layer may be formed at any position based on the thickness of the solid electrolyte membrane through phase separation. As shown in portion (d) of FIG. 1, the interrupting layer may be formed, while the polymer material surrounds the solid electrolyte material. Meanwhile, when such phase separation occurs in the mode as shown in (d) of FIG. 1, it can be said that the interrupting layer is formed at both sides of the top and bottom of the solid electrolyte membrane. One or more interrupting layers may be formed in the solid electrolyte membrane.

The interrupting layer refers to a structure formed through the concentration of the polymer material (A) at a local site with a high concentration and inhibiting ion conduction, and is not limited to any specific shape. For example, the interrupting layer may be formed in the solid electrolyte membrane or on any one surface of the solid electrolyte membrane with a layered structure. Such a layered structure may be formed totally at a predetermined depth or on the surface of the solid electrolyte membrane, or may have a layer-like shape formed by aggregation of droplets of molten polymer. FIG. 1 schematically illustrates various embodiments of the interrupting layer. When the interrupting layer is developed according to an increase in battery temperature, ion conduction is interrupted and battery driving is stopped, resulting in improvement of the heat resistance and safety of the battery.

For example, the solid electrolyte membrane according to an embodiment of the present disclosure may be obtained by the following method, but is not limited thereto. Particularly, the following description relates to an embodiment which uses a polymer electrolyte (C) as a solid electrolyte material (B).

First, a polymer electrolyte (C) and a polymer material (A) are introduced to a suitable solvent to prepare a polymer solution for forming a solid electrolyte membrane. According to an embodiment of the present disclosure, a lithium salt, a polymer resin (C2) and a polymer material (A) may be introduced at the same time, or may be introduced sequentially.

The polymer solution may have a concentration controlled adequately to allow homogeneous coating on the solid electrolyte membrane, and the concentration is not particularly limited. The solvent may be any solvent with no particular limitation, as long as it does not cause any change in the ingredients introduced thereto and can be removed subsequently through a drying process. Any suitable solvent ay be selected depending on the ingredients introduced thereto. For example, when an alkylene oxide-based polymer, such as polyethylene oxide (PEO), is used as a polymer resin (C2), acetonitrile may be used as a solvent. Next, the polymer solution is applied to a release sheet, such as a terephthalate film, followed by molding into a film having a predetermined thickness. The application and molding may be carried out by using a known coating process, such as doctor blade coating. Then, the resultant film is dried, and the solvent is removed to obtain a solid electrolyte membrane. Meanwhile, according to an embodiment of the present disclosure, the solid electrolyte membrane may further include 10 wt % or less of a binder resin, if necessary.

In another aspect of the present disclosure, there is provided a solid state battery including the above-described solid electrolyte membrane. The solid state battery includes a positive electrode, a negative electrode and a solid electrolyte membrane. According to an embodiment of the present disclosure, the negative electrode may include lithium metal as a negative electrode active material.

According to the present disclosure, each of the positive electrode and the negative electrode may include a current collector and an electrode active material layer formed on at least one surface of the current collector, wherein the electrode active material layer may include a plurality of electrode active material particles and a solid electrolyte. According to an embodiment of the present disclosure, a current collector itself may be used as a negative electrode, while not forming an active material layer on the surface of the current collector. In addition, each electrode may further include at least one of a conductive material and a binder resin, if necessary. Additionally, each electrode may further include various additives in order to supplement or improve the physicochemical properties of the electrode.

According to the present disclosure, in the case of a negative electrode active material, lithium metal may be used as a negative electrode active material for a lithium ion secondary battery. In addition to lithium metal, any material used conventionally as a negative electrode active material may be used. For example, the negative electrode active material may include at least one selected from: carbon such as non-graphitizable carbon, graphitic carbon, or the like; metal composite oxides such as $Li_xFe_2O_3$ (0≤x≤1), $Li_xWO_2$ (0≤x≤1), $Sn_xMe_{1-x}Me'_yO_z$ (Me:Mn, Fe, Pb or Ge; Me':Al, B, P, Si, an element of Group 1, Group 2 or Group 3 in the Periodic Table, or halogen; 0<x≤1; 1≤y≤3; 1≤z≤8); lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like.

In the case of a positive electrode, the electrode active material may be any material used conventionally as a positive electrode active material for a lithium ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1), $Li_aMn_xNi_yCo_zO_4$ (wherein 0.5<a<1.5, 0<x, y, z<1, x+y+z=1), or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; carbon fluoride; metal powder, such as, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer terpolymer (EPDM), sulfonated EPDM, styrene butadiene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, each electrode active material layer may include at least one additive, such as an oxidation stabilizing additive, reduction stabilizing additive, flame retardant, heat stabilizer, antifogging agent, or the like, if necessary.

According to the present disclosure, the solid electrolyte material contained in the electrode may include at least one of a polymeric solid electrolyte, an oxide-based solid electrolyte and a sulfide-based solid electrolyte. Reference will be made to the above description about the polymeric solid electrolyte material.

The oxide-based solid electrolyte contains oxygen (O), and has conductivity of metal ions that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \leq x \leq 1$, $0 \leq y \leq 1$), $LiAl_xZr_{2-x}(PO_4)_3$ (wherein $0 \leq x \leq 1$, $0 \leq y \leq 1$), $LiTi_xZr_{2-x}(PO_4)_3$ (wherein $0 \leq x \leq 1$, $0 \leq y \leq 1$), LISICON compounds, UPON compounds, perovskite compounds, NASICON compounds and LLZO compounds. However, the scope of the present disclosure is not limited thereto.

The sulfide-based solid electrolyte contains sulfur (S), has conductivity of metal ions that belong to Group 1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, or the like. However, the scope of the present disclosure is not limited thereto.

Referring to the solid electrolyte material, in the case of a positive electrode, an electrolyte material having high oxidation stability may be used as a solid electrolyte. In addition, in the case of a negative electrode, an electrolyte material having high reduction stability may be used as a solid electrolyte. However, the scope of the present disclosure is not limited thereto. Since the solid electrolyte mainly functions to conduct lithium ions in the electrodes, any material having a high ion conductivity, such as $10^{-7}$ S/Cm or more, or $10^{-5}$ S/cm or more, may be used, and the solid electrolyte material is not limited any specific ingredient.

In still another aspect of the present disclosure, there is provided a secondary battery having the above-described structure. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

EXAMPLES

1. Manufacture of Solid Electrolyte Membrane

Example 1

First, a polystyrene-polyethylene oxide block copolymer (polystyrene-co-polyethylene oxide, PS-b-PEO, ion conductivity: $8 \times 10^{-8}$ S/cm at room temperature) and polyethylene oxide (PEO) (molecular weight (Mn): 600 kg/mol) were introduced to tetrahydrofuran (THF) as a solvent at a weight ratio of 2:8 to prepare a 5 wt % polymer solution. Herein, PS-b-PEO was a copolymer including a polystyrene (PS) block and polyethylene oxide (PEO) block bound to each other at each end thereof. In the copolymer, the PS block had a molecular weight (Mn) of 60 kg/mol and the PEO block had a molecular weight (Mn) of 18 kg/mol. Herein, LiTFSI as a lithium salt was also introduced thereto at a molar ratio of $[EO]/[Li^+]=18/1$. The polymer solution was agitated overnight at 60° C. so that the PS-b-PEO, PEO and lithium salt introduced thereto might be dissolved sufficiently. The polymer solution was coated through spin coating at 1000 rpm for 1 minute and dried overnight at room temperature under vacuum. In this manner, a solid electrolyte membrane was obtained. The resultant solid electrolyte membrane had a thickness of about 30 µm.

Example 2

A solid electrolyte membrane was obtained in the same manner as Example 1, except that PS-b-PEO and PEO were used at a weight ratio of 4:6 and the resultant solid electrolyte membrane had a thickness of 30 μm.

Example 3

A solid electrolyte membrane was obtained in the same manner as Example 1, except that PS-b-PEO and PEO were used at a weight ratio of 5:5, wherein PS-b-PEO was a copolymer including a polystyrene (PS) block and polyethylene oxide (PEO) block bound to each other at each end thereof, the PS block had a molecular weight (Mn) of 26 kg/mol and an ion conductivity of $5 \times 10^{-7}$ S/cm (at room temperature), the PEO block had a molecular weight (Mn) of 32 kg/mol, and the resultant solid electrolyte membrane had a thickness of 30 μm.

Comparative Example 1

Polyethylene oxide (PEO, $M_w$=4,000,000 g/mol) was dissolved in acetonitrile (AN) as a solvent to prepare a 4 wt % polymer solution. Herein, LiTFSI as a lithium salt was also introduced thereto at a molar ratio of [EO]/[Li$^+$]=18/1. The resultant mixture was agitated overnight so that PEO and lithium salt might be dissolved sufficiently in the polymer solution. Next, an additive solution containing an initiator and a curing agent was prepared. The curing agent was PEGDA ($M_w$=575), the initiator was benzoyl peroxide (BPO), polyethylene glycol diacrylate (PEGDA) was used in an amount of 20 wt % based on PEO, BPO was used in an amount of 1 wt % based on PEGDA, and acetonitrile was used as a solvent. The additive solution was agitated for about 1 hour so that the ingredients introduced thereto might be mixed thoroughly. Then, the additive solution was added to the polymer solution and the two solutions were mixed thoroughly. The mixed solution was applied to and coated on a release film by using a doctor blade. The coating gap was set to 800 μm and the coating rate was set to 20 mm/min. The release film coated with the coating solution was transferred to a glass plate, allowed to maintain level, dried overnight at room temperature, and vacuum dried at 100° C. for 12 hours. In this manner, a solid electrolyte membrane was obtained. The resultant solid electrolyte membrane had a thickness of about 50 μm.

2. High-Temperature Exposure Test

Examples 1-1 to 1-3

Three solid electrolyte membrane samples were prepared from Example 1. Each sample was allowed to stand at room temperature, or exposed to 100° C. for 6 hours or to 100° C. for 12 hours, and recovered to determine ion conductivity. The results of ion conductivity determination are shown in the following Table 1.

Ion conductivity was determined by the following method. Each of the solid electrolyte membranes according to Examples 1-1 to 1-3 was cut into a circular shape with a size of 1.7671 cm$^2$. The solid electrolyte membrane was disposed between two sheets of stainless steel (SUS) to obtain a coin-cell. Then, electrochemical impedance was measured by using an analyzer (VMP3, Biologic science instrument) at 60° C. under the conditions of an amplitude of 10 mV and a scan range of 500 kHz to 20 MHz. Based on this, ion conductivity was calculated.

TABLE 1

| | Ion Conductivity (S/cm, 60° C.) |
|---|---|
| Ex. 1-1 | 6E−05 (6 × 10$^{-5}$) |
| Ex. 1-2 | 1E−07 (1 × 10$^{-7}$) |
| Ex. 1-3 | 9E−08 (9 × 10$^{-8}$) |

The sold electrolyte membrane stored at room temperature according to Example 1-1 shows an ion conductivity within a range capable of driving a battery and undergoes degradation of ion conductivity at high temperature. Then, Example 1-3 stored at high temperature for 12 hours or more shows an ion conductivity incapable of driving a battery.

Figure 2:
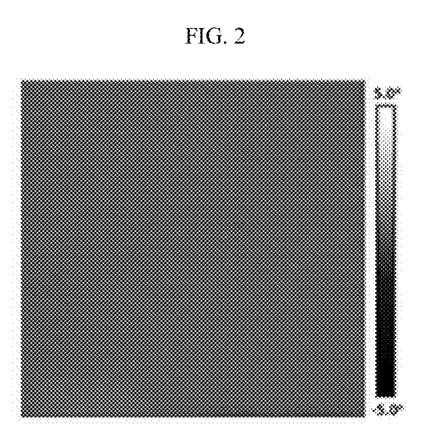
FIG. 2 and FIG. 3 illustrate atomic force microscopic (AFM) phase-mode images of the solid electrolyte membranes according to Example 1-1 and Example 1-2, respectively.
Figure 3:
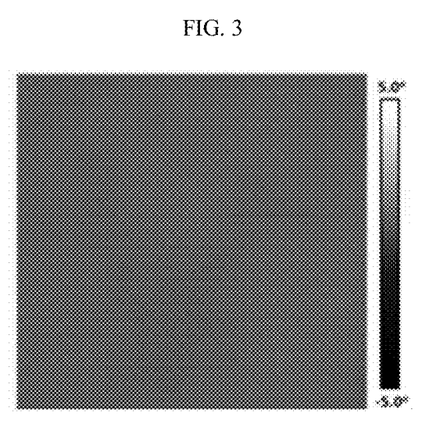

FIG. 2 and FIG. 3 illustrate atomic force microscopic (AFM) phase-mode images of the solid electrolyte membranes according to Example 1-1 and Example 1-2, respectively. Referring to the morphology of each solid electrolyte membrane, it can be seen that PS-b-PEO used as a polymer material (A) is mixed well and distributed randomly in the PEO-based polymer electrolyte according to Example 1-1. However, in the case of Example 1-2, the polymer material (A), PS-b-PEO, is reduced on the surface of the solid electrolyte membrane and there is little PS-b-PEO on the surface of the solid electrolyte membrane. It can be seen from the above results that when the solid electrolyte membrane according to the present disclosure is exposed to high temperature for a long time, PS-b-PEO is molten and undergoes phase separation to form an interrupting layer in the solid electrolyte membrane.

Examples 2-1 to 3-2

Two solid electrolyte membrane samples were prepared from each of Examples 2 and 3. Each solid electrolyte membrane sample was allowed to stand at room temperature or exposed to 100° C. for 12 hours, and then recovered to determine ion conductivity. The results of ion conductivity determination are shown in the following Table 2.

TABLE 2

| | Ion Conductivity (S/cm, 60° C.) |
|---|---|
| Ex. 2-1 (exposure to room temperature) | 3E−05 (3 × 10$^{-5}$) |
| Ex. 2-2 (exposure to 100° C.) | 6E−08 (6 × 10$^{-8}$) |
| Ex. 3-1 (exposure to room temperature) | 5E−05 (5 × 10$^{-5}$) |
| Ex. 3-2 (exposure to 100° C.) | 7E−08 (7 × 10$^{-8}$) |

Comparative Examples 1-1 and 1-2

Two solid electrolyte membrane samples were prepared from Comparative Example 1. Each solid electrolyte membrane sample was allowed to stand at room temperature or exposed to 100° C. for 12 hours, and then recovered to determine ion conductivity. The results of ion conductivity determination are shown in the following Table 3.

TABLE 3

| | Ion Conductivity (S/cm, 60° C.) |
|---|---|
| Comp. Ex. 1-1 (exposure to room temperature) | 1E−04 (1 × 10$^{-4}$) |
| Comp. Ex. 1-2 (exposure to 100° C.) | 1E−04 (1 × 10$^{-4}$) |

After determining ion conductivity, it seems that each of the solid electrolyte membranes according to Examples 2-1, 2-2, 3-1 and 3-2 also shows formation of an interrupting layer in the solid electrolyte membrane through the melting of polystyrene and phase separation, similarly to the solid electrolyte membranes according to Examples 1-1 to 1-3. In other words, when the polymer material (A), PS-b-PEO, is distributed randomly in the solid electrolyte membrane, the solid electrolyte membrane shows an ion conductivity within a range capable of driving a battery. However, when the solid electrolyte membrane is exposed to high temperature, ion conductivity is reduced rapidly due to the formation of the interrupting layer. On the contrary, the solid electrolyte membrane stored at high temperature according to Comparative Example 1-2 shows the same ion conductivity value as Comparative Example 1-1. This is because a single type of polymer is used, and thus phase separation does not occur.

3. Manufacture of Solid State Battery

NCM811 ($LiNi_{0.8}Co_{0.1}Mn_{0.1}O_2$) as a positive electrode active material, vapor grown carbon fibers (VGCF) as a conductive material, and a polymeric solid electrolyte (PEO+LiTFSI, molar ratio of [EO]:[Li+]=18:1) were mixed at a weight ratio of 80:3:17, and the resultant mixture was introduced to acetonitrile, followed by agitation, to provide electrode slurry. The slurry was applied to an aluminum current collector having a thickness of 20 μm, and the resultant product was vacuum-dried at 120° C. for 4 hours. Then, pressing was carried out by using a roll press to obtain an electrode having an electrode loading amount 2 mAh/$cm^2$, an electrode layer thickness of 48 μm and a porosity of 22%.

The positive electrode was cut into a circular shape having an area of 1.4875 $cm^2$. In addition, lithium metal foil cut into a circular shape having an area of 1.7671 $cm^2$ was prepared as a counter electrode. Each of the solid electrolyte membranes obtained from Example 1 and Comparative Example 1 was interposed between the two electrodes to obtain a coin-type half-cell.

TABLE 4

| | Discharge Capacity (mAh/g, 4.15 V) |
| --- | --- |
| Ex. 4-1 | 145 |
| Ex. 4-2 | 22 |
| Ex. 4-3 | — |
| Comp. Ex. 2-1 | 156 |
| Comp. Ex. 2-2 | 156 |

Three solid state batteries were prepared by using the solid electrolyte membrane according to Example 1. Each solid state battery was allowed to stand at room temperature (Example 4-1), or exposed to 100° C. for 6 hours (Example 4-2) or to 100° C. for 12 hours (Example 4-3), and then recovered to determine discharge capacity. In addition, two solid state batteries were prepared by using the solid electrolyte membrane according to Comparative Example 1. Each solid state battery was allowed to stand at room temperature (Comparative Example 2-1), or exposed to 100° C. for 12 hours (Comparative Example 2-2), and then recovered to determine discharge capacity. The results of discharge capacity determination are shown in the above Table 4. Each of the batteries according to Examples and Comparative Examples was charged/discharged under the following conditions to evaluate initial efficiency.

Charge condition: charged in a constant current (CC)/constant voltage (CV) mode at 0.05 C to 4.15V (0.02 C cut-off)

Discharge condition: discharged in a constant current (CC) mode to 3V at 0.05 C

As can be seen from Table 4, when the battery using the solid electrolyte membrane according to the present disclosure is exposed to high temperature, the solid electrolyte membrane undergoes a rapid decrease in ion conductivity, and thus the driving of the battery may be controlled. Therefore, it is possible to ensure the heat resistance and safety of the battery.

What is claimed is:

1. A solid electrolyte membrane for a solid state battery, comprising:
    a mixture of a polymer material (A) and a solid electrolyte material (B),
    wherein the polymer material (A) comprises a block copolymer and has an ion conductivity of $5 \times 10^{-7}$ S/cm or less at 20-30° C.,
    wherein the solid electrolyte membrane has an ion conductivity of $1 \times 10^{-7}$ S/cm or more at 20-30° C., and
    wherein the solid electrolyte material (B) comprises a polymeric solid electrolyte material.

2. The solid electrolyte membrane for a solid state battery according to claim 1, wherein the polymer material (A) comprises at least one polymerization unit selected from the group consisting of an olefinic polymerization unit, a styrenic polymerization unit, an acrylic polymerization unit, a carbide-based polymerization unit, an ester-based polymerization unit, and mixtures thereof.

3. The solid electrolyte membrane for a solid state battery according to claim 1, wherein the polymer material (A) comprises at least one polymerization unit selected from the group consisting of ethylene oxide, a polymerization unit of a polyether polymer, a polymerization unit of a polycarbonate polymer, a polymerization unit of a polyacrylate polymer, a polymerization unit of a polysiloxane polymer, a polymerization unit of a phosphazene polymer, a polymerization unit of a polypropylene oxide polymer, a polymerization unit of a polyphosphate polymer, a polymerization unit of polyvinyl alcohol, a polymerization unit of a polyvinylidene fluoride polymer, and mixtures thereof.

4. The solid electrolyte membrane for a solid state battery according to claim 1, wherein the polymer material (A) comprises at least one compound represented by the following Chemical Formula 1:

[Chemical Formula 1]

wherein each of m and n independently represents an integer of 1 or more;

$P_B$ represents at least one polymerization unit selected from the group consisting of ethylene oxide, a polymerization unit of a polyether polymer, a polymerization unit of a polycarbonate polymer, a polymerization unit of a polyacrylate polymer, a polymerization unit of a polysiloxane polymer, a polymerization unit of a phosphazene polymer, a polymerization unit of a polypropylene oxide polymer, a polymerization unit of a polyphosphate polymer, a polymerization unit of polyvinyl alcohol, a polymerization unit of a polyvinylidene fluoride polymer, and mixtures thereof; and $P_A$ represents at least one polymerization unit selected from the group consisting of an olefinic polymerization unit, a styrenic polymerization unit, an acrylic polymerization unit, a carbide-based polymerization unit, an ester-based polymerization unit, and mixtures thereof.

5. The solid electrolyte membrane for a solid state battery according to claim 4, wherein $P_B$ is present in an amount of 10-90 wt % based on 100 wt % of the polymer material (A).

6. The solid electrolyte membrane for a solid state battery according to claim 1, wherein the solid electrolyte material (B) further comprises at least one material selected from the group consisting of a sulfide-based solid electrolyte material, an oxide-based solid electrolyte material, or mixtures thereof.

7. The solid electrolyte membrane for a solid state battery according to claim 1, wherein the polymeric solid electrolyte material is a polymeric electrolyte (C) formed by mixing a lithium salt (C1) with a polymer resin (C2), and the polymeric electrolyte has an ion conductivity of $1\times10^{-7}$ S/cm or more at 20-30° C.

8. The solid electrolyte membrane for a solid state battery according to claim 6, wherein the polymer resin (C2) comprises at least one selected from the group consisting of a polyether polymer, a polycarbonate polymer, an acrylate polymer, a polysiloxane polymer, a phosphazene polymer, a polyethylene derivative, an alkylene oxide derivative including polypropyleneoxide and/or polyethylene oxide, a polyvinyl acetate polymer, a polyphosphate polymer, a polyacrylonitrile polymer, polyalginate lysine, polyester sulfide, polyvinyl alcohol, a polyvinylidene fluoride polymer, or mixtures thereof.

9. The solid electrolyte membrane for a solid state battery according to claim 7, wherein the polymer resin (C2) has a molecular weight (Mn) of 1-10,000 kg/mol.

10. The solid electrolyte membrane for a solid state battery according to claim 1, wherein the solid electrolyte material (B) is present in an amount of 20-80 wt % based on 100 wt % of a total solid electrolyte membrane.

11. The solid electrolyte membrane for a solid state battery according to claim 1, wherein the polymer material (A) has a molecular weight (Mn) of 1-10,000 kg/mol.

12. The solid electrolyte membrane for a solid state battery according to claim 1, wherein the solid electrolyte material (B) comprises the polymeric solid electrolyte material in an amount of 80 wt % or more based on 100 wt % of the solid electrolyte material (B).

* * * * *